United States Patent
Honda

(12) United States Patent     (10) Patent No.: US 6,963,447 B2
                                 (45) Date of Patent:     Nov. 8, 2005

(54) LIGHT DIFFUSING AGENT, LIGHT DIFFUSING SHEET, AND NONGLARE SHEET

(75) Inventor: Makoto Honda, Tokyo-to (JP)

(73) Assignee: Dai-Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/863,553

(22) Filed: Jun. 8, 2004

(65)        Prior Publication Data

US 2004/0263965 A1   Dec. 30, 2004

(30)     Foreign Application Priority Data

Jun. 27, 2003    (JP) ................................. 2003-185322

(51) Int. Cl.$^7$ ................ G03B 21/60; G02B 5/04; G02B 5/16; G02B 19/02; G02B 27/02
(52) U.S. Cl. .............. 359/452; 359/615; 428/144; 428/403
(58) Field of Search ................ 359/452–453, 359/602, 615; 428/144, 145, 323–325, 327, 402, 403, 406

(56)        References Cited

U.S. PATENT DOCUMENTS

| | | | | |
|---|---|---|---|---|
| 5,023,139 A | * | 6/1991 | Birnboim et al. | 428/402 |
| 6,451,408 B1 | * | 9/2002 | Haunschild et al. | 428/325 |
| 6,695,453 B2 | * | 2/2004 | Hannington | 359/614 |
| 6,859,314 B2 | * | 2/2005 | Yoon et al. | 359/452 |
| 2005/0042453 A1 | * | 2/2005 | James et al. | 428/403 |

* cited by examiner

*Primary Examiner*—Christopher Mahoney
(74) *Attorney, Agent, or Firm*—Harness, Dickey & Pierce, PLC

(57)        ABSTRACT

There are provided a light diffusing sheet and a nonglare sheet, which have good diffusion efficiency, can provide bright and high-contrast images and can reproduce high-quality images with reduced unnecessary scattered light and free from image haze and blur. The light diffusing sheet and the nonglare sheet comprise a light diffusing agent which, in use, is dispersed in a transparent base material. The light diffusing agent comprises core particles and a skin layer covering the surface of the core particles and satisfies requirements (i) and (ii):

$$N1 < N2 < N3 \text{ or } N3 < N2 < N1 \qquad \text{requirement (i)}$$

wherein N1 represents the refractive index of the transparent base material, N2 represents the refractive index of the skin layer, and N3 represents the refractive index of the core particles; and requirement (ii):

$$T = \sqrt{R^2 + \left(\frac{2n+1}{4}\psi\right)^2 + \frac{\sqrt{2}}{4}(2n+1)} - R$$

wherein R represents the average radius of core particles in $\mu$m, T represents the thickness of the skin layer in $\mu$m, n is an integer of not less than 0 (zero), and $\psi$ is 0.4 to 0.7 $\mu$m.

13 Claims, 2 Drawing Sheets

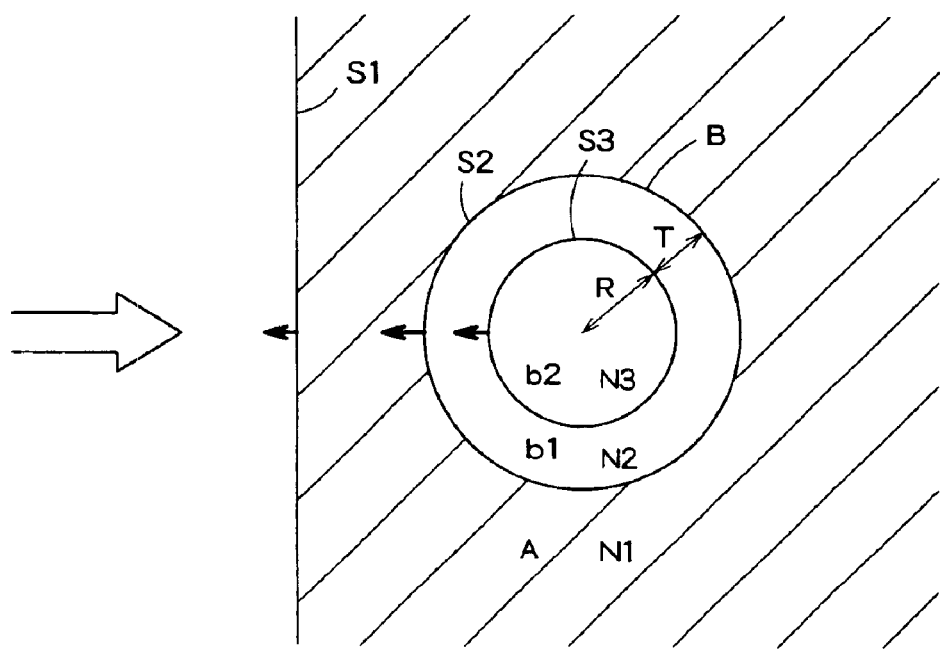
F I G. 1
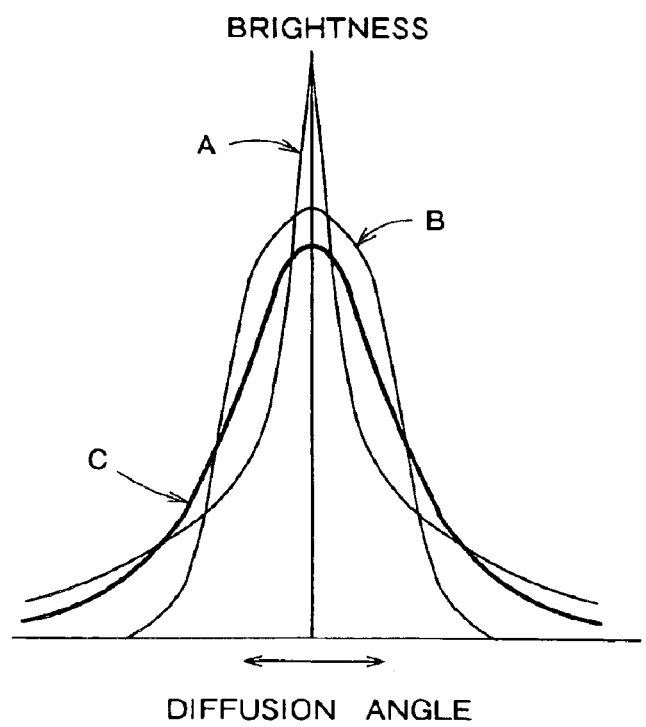
F I G. 2

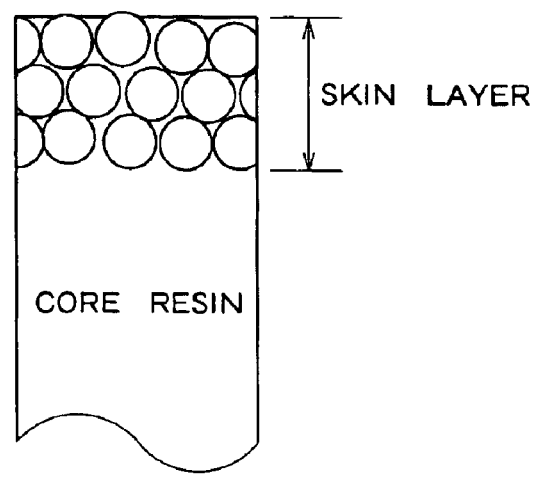
F I G. 3
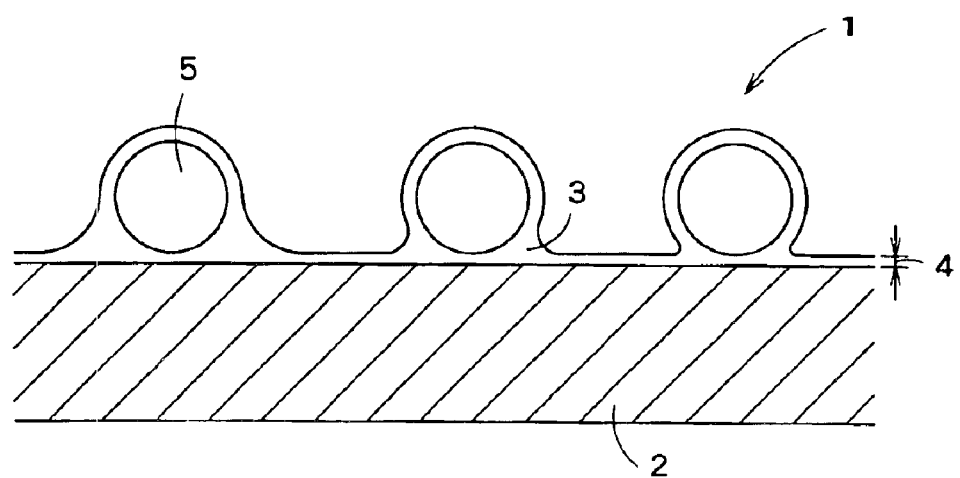
F I G. 4

LIGHT DIFFUSING AGENT, LIGHT DIFFUSING SHEET, AND NONGLARE SHEET

TECHNICAL FIELD

The present invention relates to a light diffusing agent, and a light diffusing sheet and a nonglare sheet with the light diffusing agent dispersed therein.

BACKGROUND ART

A light diffusing sheet comprising a diffusing agent such as silica, glass, or alumina dispersed in a base material of a transparent or semi-transparent thermoplastic resin is known for use in transmission projection screens, illumination and the like.

The above light diffusing sheet has been extensively put to practical use by virtue of its easy production and advantageous cost effectiveness. In this light diffusing sheet, however, when the amount of the diffusing agent used is increased for large viewing angle provision purposes in transmission projection screen applications, a significant light quantity loss or a deterioration in transparency and image resolution often occurs.

Japanese Patent Laid-Open No. 120702/1990 proposes, as one means for solving the above problem, a light diffusing sheet using a light diffusing agent in which the refractive index of the outermost edge part and the refractive index of the center part of the light diffusing agent have been specified.

The claimed advantage of the technique described in Japanese Patent Laid-Open No. 120732/1990 is to produce a light diffusing sheet which can provide images having excellent transparency, is low in light quantity loss of a light source, and can provide good light diffusing characteristics.

DISCLOSURE OF THE INVENTION

An object of the present invention, as with the above prior art, is to provide a light diffusing sheet which can produce images having excellent transparency, is low in light quantity loss of a light source and has good light diffusing characteristics, and, at the same time, can reproduce high-quality images free from image haze and blur and especially with high contrast.

According to the technique described in Japanese Patent Laid-Open No. 120732/1990, the refractive index is increased continuously or stepwise from the outermost edge part of the light diffusing agent toward the center part thereof, and, in addition, the refractive index of the outermost edge part is made substantially equal to that of the transparent base material. In general, this technique mainly aims to solve the above problem of the prior art by eliminating the difference in refractive index between the transparent base material and the outermost edge part of the diffusing agent to reduce the occurrence of reflection from interfaces.

On the other hand, in the present invention, the requirement for the correlation among the refractive index of a transparent base material, the refractive index of a skin layer in a diffusing agent, and the refractive index of core particles and the requirement for the relationship between the average radius of the core particles and the thickness of the skin layer are mainly specified, and the present invention has been made based on such finding that the above problem of the prior art can be solved by positively utilizing the reflection from interfaces and allowing the reflected lights to positively interfere with each other in a specific embodiment.

According to one aspect of the present invention, there is provided a light diffusing agent which, in use, is dispersed in a transparent base material or medium, said light diffusing agent comprising core particles and a skin layer covering the surface of the core particles, said light diffusing agent satisfying requirements (i) and (ii):

$$N1 < N2 < N3 \text{ or } N3 < N2 < N1 \qquad \text{requirement (i)}$$

wherein N1 represents the refractive index of the transparent base material or medium, N2 represents the refractive index of the skin layer, and N3 represents the refractive index of the core particles; and requirement (ii):

$$T = \sqrt{R^2 + \left(\frac{2n+1}{4}\psi\right)^2 + \frac{\sqrt{2}}{4}(2n+1)} - R$$

wherein R represents the average radius of core particles in μm, T represents the thickness of the skin layer in μm, n is an integer of not less than 0 (zero), and ψ is 380 nm to 780 nm.

In the light diffusing agent according to the present invention, preferably, the core particles have an average particle diameter of 1 to 30 μm.

In the light diffusing agent according to the present invention, preferably, the light diffusing agent further satisfies requirement (iii):

$$|N1-N3| > 0.04. \qquad \text{requirement (iii)}$$

According to another aspect of the present invention, there is provided a light diffusing sheet comprising the above light diffusing agent dispersed in a part or the whole of the above transparent base material or medium.

According to still another aspect of the present invention, there is provided a light diffusing sheet comprising, dispersed in a part or the whole of the transparent base material or medium, the above light diffusing agent and a light diffusing agent satisfying requirement (iv):

$$|N1-N3| \leq 0.04. \qquad \text{requirement (iv)}$$

In the present invention, a diffusing element such as a lenticular lens and a prism, or an optical axis deflecting element such as a Fresnel lens may be provided on the whole or a part of at least one side of the above light diffusing sheet.

Further, in the present invention, a hard coating and/or an antireflection coating may be provided on the whole or a part of at least one side of the above diffusing sheet.

According to a further aspect of the present invention, there is provided a nonglare sheet comprising: a substantially transparent substrate; a coating formed of a transparent base material or medium provided on the whole or a part of the outermost surface of the substrate on its viewer side; and, dispersed in the coating, the above light diffusing agent having a larger particle diameter than the thickness of the coating.

BRIEF DESCRIPTION OF THE DRAWINGS

FIG. 1 is a typical partially enlarged view showing the structure of a light diffusing sheet according to the present invention;

FIG. 2 is a diagram showing a diffusing angle and a change in brightness as a function of a difference between the refractive index (N1) of a transparent base material and the refractive index (N3) of core particles;

FIG. 3 is a typical cross-sectional view showing a packed structure in which a skin layer in the light diffusing agent according to the present invention has been packed with nano particles; and FIG. 4 is a typical cross-sectional view of a nonglare sheet according to the present invention.

BEST MODE FOR CARRYING OUT THE INVENTION

<Light Diffusing Agent>

The light diffusing agent according to the present invention is a light diffusing agent which, in use, is dispersed in a transparent base material or medium. The light diffusing agent comprises core particles and a skin layer covering the surface of the core particles and satisfies requirements (i) and (ii):

$$N1<N2<N3 \text{ or } N3<N2<N1 \qquad \text{requirement (i)}$$

wherein N1 represents the refractive index of the transparent base material or medium, N2 represents the refractive index of the skin layer, and N3 represents the refractive index of the core particles; and requirement (ii):

$$T = \sqrt{R^2 + \left(\frac{2n+1}{4}\psi\right)^2 + \frac{\sqrt{2}}{4}(2n+1)} - R$$

wherein R represents the average radius of core particles in $\mu$m, T represents the thickness of the skin layer in $\mu$m, n is an integer of not less than 0 (zero), and $\psi$ is 380 nm to 780 nm, in general 400 nm to 700 nm.

The refractive index may be generally determined by measuring wavelengths in the wavelength range of visible light by a measuring method such as a Duc de Chaulnes method, a Fraunhoffer method, an Abbe method, a Kohlrausch method, a Pulfrich method, and a dipping method. Among the above methods, the Abbe method was adopted in the present invention.

The reason for setting of the requirement (i), the requirement (ii) and the like and the principle of the present invention will be briefly described, if necessary, with reference to the accompanying drawings.

FIG. 1 shows a light diffusing sheet including a transparent base material (A). A light diffusing agent (B) is dispersed in the transparent base material (A). The light diffusing agent (B) comprises core particles (b2) and a skin layer (b1) covering the surface of the core particles (b2). In an actually used light diffusing sheet, in general, a large number of dispersing agent particles are dispersed in the transparent base material (A). In FIG. 1, however, only a single light diffusing agent particle is shown for simplifying the explanation of the light diffusing sheet.

In FIG. 1, N1 designates the refractive index of the transparent base material (A), N2 the refractive index of the skin layer (b1), N3 the refractive index of the core particles (b2), T the thickness of the skin layer (b1), R the radius of the core particles, S1 the interface of the transparent base material and the outside of the light diffusing sheet, S2 the interface of the transparent base material and the skin layer, and S3 the interface of the skin layer and the core particles.

In the light diffusing sheet shown in FIG. 1, as indicated by a white arrow, light incident on the light diffusing sheet from the left side of the light diffusing sheet causes reflected light (indicated by black arrows) at the interface S1, the interface S2, and the interface S3. Here for simplifying the explanation, reference has been made to reflected light produced by reflection in a perpendicular direction of light incident perpendicular to a face approximated to a plane in a part of a particulate diffusing agent.

In general, in a light diffusing sheet comprising a light diffusing agent dispersed in a transparent base material, reducing the reflection from the surface (S1) of the transparent base material is also usually desired. Therefore, it is preferred that the following relationship be satisfied and the refractive index of the transparent base material (N1) be small: refractive index of transparent base material (N1) <refractive index of core particles (N3). For example, when the core particles are required to be formed of a low-refractive index material or when the reflection of the transparent base material per se is not a severe problem, e.g., because of use in a liquid, the refractive index of the core particles may be lowered so that the relationship N3<N2<N1 is satisfied.

When light is applied to the light diffusing agent, a part of the light is reflected from the interface (S2). After a major part of the remaining light advances through the skin layer (b1) by the thickness (T) of the skin layer (b1), a part of this traveled light is reflected from the interface (S3), advances again through the skin layer (b1) by the thickness (T) of the skin layer (b1) and is then passed through the interface (S2). Therefore, light reflected in light incident direction by the light diffusing agent includes the light reflected from the interface (S2) and the light reflected from the interface (S3). The wavelength of incident light is not substantially changed by the reflection from the interface (S2) and the reflection from the interface (S3). Therefore, the wavelength of the light reflected from the interface (S2) can be regarded as substantially identical to the wavelength of the light reflected from the interface (S3).

On the other hand, due to the reflection from the interfaces (both from the interfaces S2 and S3), the shape of the reflected waveform of light is reverse of the shape of the waveform of the incident light. Therefore, both the reflected light having a waveform caused by the reflection from the interface (S2) and the reflected light having a waveform caused by the reflection from the interface (S3) are observed in a mixed state.

The present inventors have found that the quantity of the reflected light observed can be reduced by allowing the light reflected from the interface (S2) of the transparent base material and the skin layer to interfere with the light reflected from the interface (S3) of the skin layer and the core particles. The present invention has been made base on such finding.

Accordingly, in the present invention, the thickness (T) of the skin layer should satisfy requirement (ii):

$$T = \sqrt{R^2 + \left(\frac{2n+1}{4}\psi\right)^2 + \frac{\sqrt{2}}{4}(2n+1)} - R$$

wherein R represents the average radius of core particles in $\mu$m, T represents the thickness of the skin layer in $\mu$m, n is an integer of not less than 0 (zero), and $\psi$ is 380 nm to 780 nm, in general 400 nm to 700 nm.

The interference between the light reflected from the interface (S2) and the light reflected from the interface (S3) is observed when 2T is ½, 3/2, 5/2, 7/2 . . . of the wavelength of the incident light, that is, when T is ¼, ¾, 5/4, 7/4 . . . of the wavelength of the incident light. In the present invention, the thickness (T) of the skin layer is preferably as small as possible so far as the effect of the present invention can be attained, except under special circumstances. Therefore, particularly preferably, n is 0 (zero), that is, T is ¼ of the wavelength of the incident light. That is, most preferably, the skin layer is formed of a skin layer material having a refractive index (N2) of N2=√(N1×N3) in a thickness (T) of quarter wavelength. In this case, the light reflected from the interface (S2) and the light reflected from the interface (S3) are allowed to effectively interfere with each other, resulting in suppression or elimination of unfavorable reflection.

When the light diffusing agent is used in light diffusing sheets for projectors, effective reflection prevention of visible light with wavelengths 380 nm to 780 nm, generally 400 nm to 700 nm suffices for contemplated effect. Therefore, in this case, the maximum value of the thickness (T) of the skin layer is preferably a quarter of 700 nm, that is, 0.175 μm. The minimum value of the thickness (T) of the skin layer varies depending upon the particle diameter of the core in the case of visible light with wavelength 400 nm. For example, however, when the size of the core particles is 10 μm, the minimum value of the thickness (T) of the skin layer is 0.071 μm. In the formula representing requirement (ii), the minimum value of the thickness (T) of the skin layer has been determined on the premise that the incident angle at which backscatter becomes substantially eliminated is not less than 45° and the minimum value of the thickness of the skin layer is a quarter of the minimum wavelength ψ.

The average radius R of the core particles is 1 to 30 μm, preferably 1 to 20 μm. In the case of a transmission screen, the average radius R of the core particles is particularly preferably 3 to 15 μm. When the average particle diameter is less than 1 μm, yellowish color is sometimes disadvantageously developed due to the influence of wavelength dependency. On the other hand, when the average particle diameter exceeds 30 μm, the roughness of the image is likely to increase. In the present invention, the average particle diameter of the core particles refers to length average diameter and may be measured, for example, by a microscopic method.

The light diffusing agent according to the present invention preferably satisfies requirement (iii) in addition to requirements (i) and (ii):

$|N1-N3|>0.04.$  requirement (iii)

When the difference between the refractive index (N1) of the transparent base material and the refractive index (N3) of the core particles is small, the effect of the light diffusing agent is small and, in addition, the reflection prevention effect of the skin layer is poor. Therefore, in this case, the light diffusing agent according to the present invention preferably satisfies requirement (iii).

In the present invention, inorganic and organic materials commonly used in the art as the high diffusing agent in this type of light diffusing sheets may be used as materials for constituting core particles. Examples of such materials include inorganic materials such as barium sulfate, calcium carbonate, titanium oxide, and glass and organic materials such as acrylic resins, styrene, styrene-acryl resins, and melamine resins. In the present invention, materials having a refractive index of 1.49 to 1.7, particularly organic beads having a refractive index of 1.49 to 1.6 are preferred from the viewpoint of easiness on refractive index regulation and skin layer formation.

The skin layer may be formed of any material so far as requirement (i) according to the present invention is satisfied and the effect of the present invention can be attained. Examples of materials usable herein include inorganic materials such as magnesium fluoride and silica, and organic materials such as fluororesins, olefin resins, acrylic resins, and acryl-styrene copolymer resins. In order to provide a predetermined refractive index, the incorporation of various auxiliary materials or the formation of a nano balloon skin layer may be adopted.

Preferred methods for forming a skin layer on the surface of core particles include, for example, a method in which a material for skin layer formation is deposited on the surface of core particles by vapor deposition, plating or the like, a two-stage suspension polymerization method in which two stages of polymerization, i.e., polymerization for core particle formation and polymerization for skin layer formation, are carried out, a microcapsule method, a suspension polymerization method utilizing an aerosol surfactant, and a method in which nano balloons are adsorbed on the surface of core particles.

In particular, the method in which resin beads having on its surface a skin layer of nano particles are formed by suspension polymerization using nano particles is more preferred, because diffusing agents of the present invention with a skin layer refractive index between (0.26×n2+0.74× n1), i.e., a refractive index in the case of nano particle closest packing, wherein n1 represents the refractive index of the nano particles and n2 represents the refractive index of the core material of the resin beads, and the refractive index n2 of the core particle material can be produced by selecting proper conditions. Incidentally, as shown in FIG. 3, for example, since the resin constituting the core particles enters gaps among the nano particles which have been packed in a multistage on the surface of the core resin, the refractive index of the skin layer is between the refractive index in the case of the closest packing (percentage void 26%) and the refractive index in the case of a substantially nano particle-free state, i.e., percentage void 100%. The thickness of the skin layer varies depending upon conditions for polymerization and the type of materials.

<Light Diffusing Sheet>

The light diffusing sheet according to the present invention is characterized in that the light diffusing agent according to the present invention is dispersed in a part or the whole of the transparent base material or medium.

Materials commonly used in the prior art in this type of light diffusing sheets may be used as the material for constituting the transparent base material, and examples thereof include: thermoplastic resins and thermosetting resins such as polymethyl methacrylate, polystyrene, polycarbonate, polyester, polyolefin, polyvinyl chloride, and epoxy resins; and transparent inorganic materials such as glass.

In the present invention, the use of thermoplastic resins, particularly acrylic resins, acryl-styrene copolymer resins, cycloolefin resins, or polycarbonate resins, is preferred. The use of the thermoplastic resin facilitates the production of light diffusing sheets, facilitates imparting suitable flexibility, hardness, and strength to the light diffusing sheet, and facilitates fabricating the light diffusing sheet into a form suitable for specific applications.

The amount of the light diffusing agent according to the present invention incorporated is not particularly limited. In general, however, the amount of the light diffusing agent incorporated is 0.1 to 20 parts by weight based on 100 parts by weight of the transparent base material constituting the light diffusing sheet, and is 0.2 to 5 parts by weight in the case of a transmission screen. The light diffusing agent may be used as a mixture with other conventional diffusing agent.

In the present invention, since good light diffusing properties are provided by the effect attained by using a predetermined light diffusing agent satisfying requirements (i) and (ii), a deterioration in contrast and the occurrence of blurring are reduced even in the case where the amount of the light diffusing agent incorporated is relatively large. In particular, a light diffusing sheet, which is free from a see-through property, has a high diffusing capability, has a high contrast, and has a high light transmittance, can be provided by using a mixture of a diffusing agent, which is small in difference in a refractive index from the base material, with this diffusing agent, which is large in difference in a refractive index from the base material.

Further, in the present invention, the combined use, as the diffusing agent which is small in difference in a refractive index from the base material, of a predetermined light diffusing agent satisfying requirements (i) and (ii) described above and a light diffusing agent satisfying requirement (iv) described below can realize dispersion of a large amount of diffusing agents to prevent the development of the see-through property and to reduce angle dependency of image quality and, at the same time, to further improve contrast and light transmittance:

$|N1-N3| \leq 0.04.$  requirement (iv)

Specifically, as shown in FIG. 2, when the difference in refractive index between the refractive index (N1) of the transparent base material and the refractive index (N3) of the core particles is large (in the case of A), the diffusion angle range is advantageously broad. In this case, however, a change in brightness depending upon diffusion angle is increased, whereby the so-called "through-area phenomenon" is likely to occur. Therefore, the combined use of this diffusing agent and a diffusing agent in which the difference between the refractive index (N1) and the refractive index (N3) is relatively small (in the case of B) can properly suppress a change in brightness depending upon diffusion angle while maintaining the large diffusion angle range (in the case of C).

The mixing ratio between the light diffusing agent satisfying requirements (i) and (ii) (or requirements (i), (ii), and (iii)) and the other light diffusing agent (the light diffusing agent satisfying requirements (i), (ii), and (iv)) may be properly determined depending upon specific applications of the contemplated light diffusing sheet and the like while taking into consideration mainly the correlation between the diffusion angle and the brightness. For example, the predetermined light diffusing agent satisfying requirements (i) and (ii) (or requirements (i), (ii), and (iii)) may be used in an amount of 0.1 to 100 parts by weight, preferably 1 to 10 parts by weight, based on 100 parts by weight of the other light diffusing agent (the light diffusing agent satisfying requirements (i), (ii), and (iv)). Further, it is a matter of course that two or more light diffusing agents may be used. In this case, the use of the light diffusing agent according to the present invention as the diffusing agent having a larger refractive index difference is particularly preferred from the viewpoint of avoiding a deterioration in contrast.

The light diffusing sheet according to the present invention is preferably produced, for example, by mixing the transparent material constituting the transparent base material with a predetermined light diffusing agent satisfying requirements (i) and (ii) and, if necessary, other light diffusing agent and the like and extruding the mixture. According to this method, a matte light diffusing sheet suitable for projection televisions in which external light reflection is unfavorable can be easily produced in an efficient and cost-effective manner.

In the light diffusing sheet according to the present invention, if necessary, an optical function layer and/or a suitable protective layer and the like may be formed.

Examples of suitable optical functional layers include lens layers for light focusing or diffusing, preferably lenticular lens layers formed of a transparent or semi-transparent material, surface antireflection layers, nonglare layers, clear layers, hard coatings, moisture-resistant layers, and antistatic layers.

Preferred light diffusing sheets according to the present invention include, for example, a light diffusing sheet in which a lenticular lens is provided on the whole or a part of at least one side of the above light diffusing sheet, and a light diffusing sheet in which a hard coating and/or a nonreflection coating is provided on the whole or a part of at least one side of the above light diffusing sheet.

Further, for example, a Fresnel lens may be provided on the whole or a part of at least one side of the light diffusing sheet according to the present invention.

The light diffusing agent according to the present invention may be dispersed in a transparent or colored ink using a transparent resin as a binder, and, for example, when used in a color filter for LCD, can also provide a diffusion effect without sacrificing the contrast.

Furthermore, when the light diffusing agent according to the present invention is used in a larger thickness than the thickness of ink coating, a matte layer can be formed in which the surface of the ink coating has concaves and convexes and has a diffusing capability. Therefore, a nonglare layer, which can prevent reflection from the surface of an optical member and provides high contrast, can also be provided.

The effect of the light diffusing agent and the light diffusing sheet according to the present invention may be evaluated by visually evaluating image quality, mainly contrast of display images. For example, the effect can be objectively judged by the following evaluation method.

A method in which the diffusing sheet (A) with the diffusing agent according to the present invention dispersed therein is compared with the diffusing sheet (B) with a conventional diffusing agent dispersed therein.

(i) The transmittance of the diffusing sheet (A) and the transmittance of the diffusing sheet (B) are measured at an identical diffusion angle:

transmittance of (A)>transmittance of (B).

(ii) The reflectance of the diffusing sheet (A) and the reflectance of the diffusing sheet (B) are measured at an identical diffusion angle:

reflectance of (A)<reflectance of (B).

(iii) The diffusion angle of the diffusing sheet (A) and the diffusion angle of the diffusing sheet (B) are measured at an identical reflectance or transmittance:

diffusion angle of (A)>diffusion angle of (B).

(iv) A value obtained by multiplying the diffusion angle of the diffusing sheet (A) by a peak gain and a value obtained by multiplying the diffusion angle of the diffusing sheet (B) by a peak gain are compared with each other:

value of (A)>value of (B).

(v) A test chart is projected on the diffusing sheet (A) and the diffusing sheet (B) to measure resolution:

resolution of (A)>resolution of (B).

<Nonglare Sheet>

The nonglare sheet according to the present invention comprises: a substantially transparent substrate; a coating formed of a transparent base material or medium provided on the whole or a part of the outermost surface of the substrate on its viewer side; and, dispersed in the coating, the above light diffusing agent having a larger particle diameter than the thickness of the coating.

A preferred embodiment of the nonglare sheet according to the present invention is shown in FIG. 4. A nonglare sheet 1 shown in FIG. 4 includes a substantially transparent substrate 2. A coating 3 of a transparent base material or medium is provided on the whole or a part of the outermost surface of the substrate 2 on its viewer side. A light diffusing agent 5 according to the present invention having a larger particle diameter than the thickness 4 of the coating 3 is dispersed in the coating 3.

Thus, when the light diffusing agent according to the present invention having a larger particle diameter than the thickness of the coating is used, a matte layer having a surface with concaves and convexes and having a diffusion capability can be formed. Therefore, a high-contrast nonglare sheet capable of preventing reflection from its surface can be provided.

EXAMPLE

Example 1

2 parts of a diffusing agent having a particle diameter of 10 μm comprising a melamine resin bead having a refractive index of 1.6 and a 0.1 μm-thick skin layer composed mainly of silica particles with a refractive index of 1.45 and surrounding the resin bead (refractive index of skin layer: 1.54) was added to polymethyl methacrylate with a refractive index of 1.49, and the mixture was extruded into a sheet having a size of 1 m square and a thickness of 1 mm.

The refractive index of the skin layer is a calculated value determined based on a silica particle packing ratio of 40% and a melamine resin packing ratio of 60% determined from a photograph of the cross section of the skin layer.

Images were projected with a slide projector in which this sheet was placed in a box. The images were visually compared and evaluated. As a result, the light diffusing sheet using the light diffusing agent according to the present invention caused no significant external light-derived lowering in contrast and could also realize the observation of a sharp line image.

According to the present invention, the light diffusing agent satisfying specific requirements (i) and (ii) can provide a light diffusing sheet which is advantageous in that the light quantity loss of a light source is small, the diffusion efficiency is good, images having good brightness and contrast are provided, and, by virtue of a reduction in unnecessary scattered light, can reproduce high-quality images free from image haze and blur.

Further, the light diffusing agent can provide a high-contrast nonglare sheet capable of preventing reflection from its surface.

What is claimed is:

1. A light diffusing agent which, in use, is dispersed in a transparent base material or medium, said tight diffusing agent comprising core particles and a skin layer covering the surface of the core particles, said tight diffusing agent satisfying requirements (i) and (ii):

N1<N2<N3 or N3<N2<N1    requirement (i)

wherein N1 represents the refractive index of the transparent base material or medium, N2 represents the refractive index of the skin layer, and N3 represents the refractive index of the core particles; and requirement (ii):

$$T = \sqrt{R^2 + \left(\frac{2n+1}{4}\psi\right)^2 + \frac{\sqrt{2}}{4}(2n+1)} - R$$

wherein R represents the average radius of core particles in μm, T represents the thickness of the skin layer in μm, n is an integer of not less than 0 (zero), and ψ is 380 nm to 780 nm.

2. The light diffusing agent according to claim 1, wherein said core particles have an average particle diameter of 1 to 30 μm.

3. A nonglare sheet comprising: a substantially transparent substrate; a coating formed of a transparent base material or medium provided on the whole or a part of the outermost surface of the substrate on its viewer side; and, dispersed in the coating, the light diffusing agent according to claim 2 having a larger particle diameter than the thickness coating.

4. The light diffusing agent according to claim 1 or 2, which further satisfies requirement (iii):

|N1−N3|>0.04.    requirement (iii)

5. A nonglare sheet comprising: a substantially transparent substrate; a coating formed of a transparent base material or medium provided on the whole or a part of the outermost surface of the substrate on its viewer side; and, dispersed in the coating, the light diffusing agent according to claim 4 having a larger particle diameter than the thickness coating.

6. A light diffusing sheet comprising the light diffusing agent according to claim 1 dispersed in a part or the whole of the transparent base material or medium.

7. A light diffusing sheet comprising the light diffusing sheet according to claim 6 and a lenticular lens and/or a diffusing prism provided on the whole or a part of at least one side of the light diffusing sheet.

8. A light diffusing sheet comprising the light diffusing sheet according to claim 7 and a hard coating and/or a antireflection coating provided on the whole or a part of at least one side of the light diffusing sheet.

9. An optical axis deflected light diffusing sheet comprising the light diffusing sheet according to claim 6 and a circular Fresnel lens and/or a linear Fresnel lens provided on the whole or a part of at least one side of the light diffusing sheet.

10. A light diffusing sheet comprising the light diffusing sheet according to claim 6 and a hard coating and/or a antireflection coating provided on the whole or a part of at least one side of the light diffusing sheet.

11. A light diffusing sheet comprising, dispersed in a part or the whole of the transparent base material or medium, the light diffusing agent according to claim 1 and a light diffusing agent satisfying requirement (iv):

|N1−N3|≤0.04.    requirement (iv)

12. A light diffusing sheet comprising the light diffusing sheet according to claim 11 and a hard coating and/or a antireflection coating provided on the whole or a part of at least one side of the light diffusing sheet.

13. A nonglare sheet comprising: a substantially transparent substrate; a coating formed of a transparent base material or medium provided on the whole or a part of the outermost surface of the substrate on its viewer side; and, dispersed in the coating, the light diffusing agent according to claim 1 having a larger particle diameter than the thickness coating.

* * * * *